United States Patent
Ryba et al.

(10) Patent No.: US 11,441,018 B2
(45) Date of Patent: Sep. 13, 2022

(54) PNEUMATIC TIRE HAVING TREAD WITH THREE ELASTOMERS

(71) Applicant: The Goodyear Tire & Rubber Company, Akron, OH (US)

(72) Inventors: Jennifer Lyn Ryba, Akron, OH (US); Philip Jordan Young, Twinsburg, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 253 days.

(21) Appl. No.: 16/568,313

(22) Filed: Sep. 12, 2019

(65) Prior Publication Data

US 2021/0079198 A1    Mar. 18, 2021

(51) Int. Cl.
  *C08L 7/00* (2006.01)
  *B60C 1/00* (2006.01)
  *C08K 3/36* (2006.01)

(52) U.S. Cl.
  CPC .............. *C08L 7/00* (2013.01); *B60C 1/0016* (2013.01); *C08K 3/36* (2013.01); *C08L 2205/025* (2013.01); *C08L 2205/035* (2013.01); *C08L 2205/06* (2013.01); *C08L 2207/322* (2013.01)

(58) Field of Classification Search
  CPC .... C08L 7/00; C08L 15/00; C08L 9/00; C08L 9/06; C08L 2205/03; C08K 3/36
  See application file for complete search history.

(56) References Cited

U.S. PATENT DOCUMENTS

| | | | |
|---|---|---|---|
| 6,465,560 B1 | 10/2002 | Zanzig et al. | |
| 7,214,731 B2 * | 5/2007 | Zanzig | B60C 1/0016 524/261 |
| 8,312,905 B2 | 11/2012 | Steiner et al. | |
| 8,324,310 B2 * | 12/2012 | Robert | B60C 1/0016 524/518 |
| 8,450,424 B2 | 5/2013 | Koelle et al. | |
| 8,592,515 B2 | 11/2013 | Francik et al. | |
| 8,759,439 B2 | 6/2014 | Hirose | |
| 9,034,980 B2 | 5/2015 | Recker et al. | |
| 9,212,275 B2 * | 12/2015 | Sandstrom | C08K 3/013 |
| 9,416,259 B2 * | 8/2016 | Mathey | C08L 7/00 |
| 9,650,503 B2 | 5/2017 | Sandstrom et al. | |
| 9,771,469 B2 | 9/2017 | Sandstrom et al. | |
| 9,873,780 B1 | 1/2018 | Sandstrom | |
| 10,196,504 B2 | 2/2019 | Sandstrom | |
| 10,301,459 B2 | 5/2019 | Weber et al. | |
| 2005/0171267 A1 | 8/2005 | Zanzig et al. | |
| 2007/0175557 A1 | 8/2007 | Puhala et al. | |
| 2007/0185267 A1 | 8/2007 | Kobayashi et al. | |
| 2010/0186859 A1 | 7/2010 | Zanzig et al. | |
| 2011/0048599 A1 | 3/2011 | Ryba et al. | |
| 2014/0011944 A1 | 1/2014 | Kondo | |
| 2017/0259620 A1 * | 9/2017 | Sandstrom | B60C 1/0016 |
| 2018/0022904 A1 | 1/2018 | Weber et al. | |
| 2018/0355155 A1 | 12/2018 | Nukaga | |

FOREIGN PATENT DOCUMENTS

| | | | | |
|---|---|---|---|---|
| EP | 1837370 B1 | 5/2009 | | |
| EP | 2412731 A1 | 2/2012 | | |
| EP | 2746323 B1 | 12/2015 | | |
| EP | 2225323 B1 | 3/2017 | | |
| EP | 3450206 A1 | 3/2019 | | |
| JP | 299002 | 10/1994 | | |
| WO | WO-2007017060 A1 * | 2/2007 | ........... | B60C 1/0016 |
| WO | WO-2010072761 A * | 7/2010 | .............. | C08F 36/04 |

OTHER PUBLICATIONS

European Search Report for Serial No. EP20193542 dated Jan. 12, 2021.

* cited by examiner

Primary Examiner — Brieann R Johnston
(74) Attorney, Agent, or Firm — Mandy B Willis

(57) ABSTRACT

The present invention is directed to a pneumatic tire comprising a vulcanizable rubber composition, the vulcanization rubber composition comprising: 1) 100 parts by weight of elastomer consisting of 25 to 35 phr of a styrene-butadiene rubber, 25 to 35 phr of a polybutadiene, and 35 to 45 phr of a natural rubber or synthetic polyisoprene, wherein the styrene-butadiene rubber is a functionalized solution polymerized styrene-butadiene elastomer having a glass transition temperature Tg(A) ranging from $-30$ to $-10°$ C. and having at least one functional group; the natural rubber or synthetic polyisoprene has a Tg(B) ranging from $-60$ to $-70°$ C.; and the polybutadiene is a cis 1,4 polybutadiene having a Tg(C) ranging from $-110$ to $-90°$ C., wherein $Tg(A)-Tg(B) \geq 25°$ C., and $Tg(B)-Tg(C) \geq 25°$ C.; 2) 60 to 80 phr of a prehydrophobated silica; 3) 1 to 10 phr of carbon black; 4) 1 to 3 phr of rubber processing oil; and 5) 5 to 25 phr of at least one hydrocarbon resin having a $Tg \geq 20°$ C., wherein the weight ratio of hydrocarbon resin to rubber processing oil is greater than 8.

19 Claims, No Drawings

PNEUMATIC TIRE HAVING TREAD WITH THREE ELASTOMERS

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a low hysteresis have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads. However, improvements in rolling resistance often occur in tandem with a reduction in wet traction, and vice versa. There is a continuing need, therefore, to develop tread having both good rolling resistance and wet traction.

SUMMARY OF THE INVENTION

The present invention is directed to a pneumatic tire comprising a vulcanizable rubber composition, the vulcanization rubber composition comprising:
1) 100 parts by weight of elastomer consisting of 25 to 35 phr of a styrene-butadiene rubber, 25 to 35 phr of a polybutadiene, and 35 to 45 phr of a natural rubber or synthetic polyisoprene,
wherein the styrene-butadiene rubber is a functionalized solution polymerized styrene-butadiene elastomer having a glass transition temperature Tg(A) ranging from $-30$ to $-10°$ C. and having at least one functional group; the natural rubber or synthetic polyisoprene has a Tg(B) ranging from $-65$ to $-70°$ C.; and the polybutadiene is a cis 1,4 polybutadiene having a Tg(C) ranging from $-110$ to $-90°$ C.,
wherein Tg(A)−Tg(B)≥25° C., and Tg(B)−Tg(C)≥25° C.;
2) 60 to 80 phr of a prehydrophobated silica;
3) 1 to 10 phr of carbon black;
4) 1 to 3 phr of rubber processing oil; and
5) 5 to 25 phr of at least one hydrocarbon resin having a Tg≥20° C.; wherein the weight ratio of hydrocarbon resin to rubber processing oil is greater than 8.

DETAILED DESCRIPTION OF THE INVENTION

There is disclosed a pneumatic tire comprising a vulcanizable rubber composition, the vulcanization rubber composition comprising:
1) 100 parts by weight of elastomer consisting of 25 to 35 phr of a styrene-butadiene rubber, 25 to 35 phr of a polybutadiene, and 35 to 45 phr of a natural rubber or synthetic polyisoprene,
wherein the styrene-butadiene rubber is a functionalized solution polymerized styrene-butadiene elastomer having a glass transition temperature Tg(A) ranging from $-30$ to $-10°$ C. and having at least one functional group; the natural rubber or synthetic polyisoprene has a Tg(B) ranging from $-60$ to $-70°$ C.; and the polybutadiene is a cis 1,4 polybutadiene having a Tg(C) ranging from $-110$ to $-90°$ C.,
wherein Tg(A)−Tg(B)≥25° C., and Tg(B)−Tg(C)≥25° C.;
2) 60 to 80 phr of a prehydrophobated silica;
3) 1 to 10 phr of carbon black;
4) 1 to 3 phr of rubber processing oil; and
5) 5 to 25 phr of at least one hydrocarbon resin having a Tg≥20° C.; wherein the weight ratio of hydrocarbon resin to rubber processing oil is greater than 8.

In one embodiment, the rubber composition comprises 100 parts by weight of elastomer consisting of 25 to 35 phr of a styrene-butadiene rubber, 25 to 35 phr of a polybutadiene, and 35 to 45 phr of a natural rubber or synthetic polyisoprene.

In one embodiment, at styrene-butadiene rubber is functionalized with an alkoxysilane group and at least one group selected from sulfur containing functional group and primary amino functional groups.

In one embodiment, the rubber composition includes from 25 to 35 phr of a styrene-butadiene rubber functionalized with an alkoxysilane group and a functional group selected from sulfur containing functional groups and amino functional groups. Suitable sulfur containing groups include thiol, thioether, thioester, sulfide, or sulfanyl group. Suitable amino functional groups include primary, secondary, and tertiary amino groups. Additional examples of rubbers which may be used include solution polymerized styrene-butadiene functionalized with groups such as alkoxy including monoalkoxy, dialkoxy, and trialkoxy, silyl, thiols, thioester, thioether, sulfanyl, mercapto, sulfide, and combinations thereof. Such functionalized solution polymerized polymers may be functionalized at the polymer chain ends for example via functional initiators or terminators, or within the polymer chains for example via functional monomers, or a combination of in-chain and end-of-chain functionalization. Specific examples of suitable functional solution polymerized polymers include those described in U.S. Pat. Nos. 8,217,103 and 8,569,409 having alkoxysilyl and sulfide (i.e. thioether) functionality. Such thiol functionality includes thiol or sulfanyl functionality arising from cleavage of sulfur containing groups during compound processing, such as for example from thioesters and thioethers.

In one embodiment, the styrene-butadiene rubber is obtained by copolymerizing styrene and butadiene, and characterized in that the styrene-butadiene rubber has a thiol group and an alkoxysilyl group which are bonded to the polymer chain. In one embodiment, the alkoxysilyl group is an ethoxysilyl group.

The thiol group may be bonded to any of a polymerization initiating terminal, a polymerization terminating terminal, a main chain of the styrene-butadiene rubber and a side chain, as long as it is bonded to the styrene-butadiene rubber chain. However, the thiol group is preferably introduced to the polymerization initiating terminal or the polymerization terminating terminal, in that the disappearance of energy at a polymer terminal is inhibited to improve hysteresis loss characteristics. The thiol group may further exist as a blocked thiol (also known as blocked mercapto group) having a protective functional group attached to the sulfur atom such as in a thioester or thioether, which is then cleaved to expose the thiol sulfur during rubber mixing.

Further, the content of the alkoxysilyl group bonded to the polymer chain of the (co)polymer rubber is preferably from 0.5 to 200 mmol/kg of (styrene-butadiene rubber. The content is more preferably from 1 to 100 mmol/kg of styrene-butadiene rubber, and particularly preferably from 2 to 50 mmol/kg of styrene-butadiene rubber.

The alkoxysilyl group may be bonded to any of the polymerization initiating terminal, the polymerization terminating terminal, the main chain of the (co)polymer and the side chain, as long as it is bonded to the (co)polymer chain. However, the alkoxysilyl group is preferably introduced to the polymerization initiating terminal or the polymerization terminating terminal, in that the disappearance of energy is inhibited from the (co)polymer terminal to be able to improve hysteresis loss characteristics.

The styrene-butadiene rubber can be produced by polymerizing styrene and butadiene in a hydrocarbon solvent by anionic polymerization using an organic alkali metal and/or an organic alkaline earth metal as an initiator, adding a terminating agent compound having a primary amino group protected with a protective group and/or a thiol group protected with a protecting group and an alkoxysilyl group to react it with a living polymer chain terminal at the time when the polymerization has substantially completed, and then conducting deblocking, for example, by hydrolysis or other appropriate procedure.

The solution polymerized styrene-butadiene rubber has a glass transition temperature in a range from −30° C. to −10° C. A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute, for example according to ASTM D7426 or equivalent.

Suitable styrene-butadiene rubbers functionalized with an alkoxysilane group and a thiol group are available commercially, such as SOL 5360H from Kumho Petrochemical.

Another component of the rubber composition is from about 35 to about 45 phr of natural rubber or synthetic cis 1,4-polyisoprene having a Tg ranging from −60 to −70° C. Such natural rubber or synthetic cis 1,4-polyisoprene are well known to those skilled in the art.

Another component of the rubber composition is from 25 to about 35 phr of cis-1,4 polybutadiene, also known as polybutadiene rubber or polybutadiene (BR). Suitable polybutadiene rubbers may be prepared, for example, by organic solution polymerization of 1,3-butadiene using lithium or neodymium catalysts. The BR may be conveniently characterized, for example, by having at least a 90 percent cis 1,4-content and a glass transition temperature Tg in a range of from −90 to −110° C. Suitable polybutadiene rubbers are available commercially, such as Budene® 1223 from Goodyear and the like.

As noted earlier, the styrene-butadiene rubber is a functionalized solution polymerized styrene-butadiene elastomer having a glass transition temperature referred to herein as Tg(A) which ranges from −30 to −10° C.; the natural rubber or synthetic polyisoprene has a Tg(B) ranging from −65 to −70° C.; and the polybutadiene is a cis 1,4 polybutadiene having a Tg(C) ranging from −110 to −90° C. The styrene-butadiene rubber, natural rubber or synthetic polyisoprene, and polybutadiene satisfy the relationships Tg(A)−Tg(B) ≥25° C., and Tg(B)−Tg(C)≥25° C.

The term "phr" as used herein, and according to conventional practice, refers to "parts by weight of a respective material per 100 parts by weight of rubber, or elastomer."

The rubber composition includes from 5 to 25 phr of a hydrocarbon resin having a Tg greater than or equal to 20° C. A suitable measurement of Tg for resins is DSC according to ASTM D6604 or equivalent.

Representative hydrocarbon resins include coumarone-indene-resins, petroleum resins, C5/C9 resins, terpene polymers, alphamethyl styrene resins and mixtures thereof.

Coumarone-indene resins are well known. Various analysis indicate that such resins are largely polyindene; however, typically contain random polymeric units derived from methyl indene, coumarone, methyl coumarone, styrene and methyl styrene.

Suitable petroleum resins include both aromatic and non-aromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include dicyclopentadiene, cyclopentadiene, their dimers and diolefins such as isoprene and piperylene. Copolymers of these monomer with one another or with aromatic such as styrene and alphamethyl styrene are also included.

In one embodiment the resin is an aromatic modified polydicyclopentadiene.

Terpene polymers are commercially produced from polymerizing a mixture of alpha or beta pinene in mineral spirits. The resin is usually supplied in a variety of melting points ranging from 10° C. to 135° C.

In one embodiment, the resin is derived from styrene and alphamethylstyrene. It is considered that, in one aspect, its glass transition temperature (Tg) characteristic combined with its molecular weight (Mn) and molecular weight distribution (Mw/Mn) provides a suitable compatibility of the resin in the rubber composition, the degree of compatibility being directly related to the nature of the rubber composition.

The presence of the styrene/alphamethylstyrene resin with a rubber blend which contains the presence of the styrene-butadiene elastomer is considered herein to be beneficial because of observed viscoelastic properties of the tread rubber composition such as complex and storage modulus, loss modulus tan.delta and loss compliance at different temperature/frequency/strain as hereinafter generally described.

The properties of complex and storage modulus, loss modulus, tan.delta and loss compliance are understood to be generally well known to those having skill in such art. They are hereinafter generally described.

The molecular weight distribution of the resin is visualized as a ratio of the resin molecular weight average (Mw) to molecular weight number average (Mn) values and is considered herein to be in a range of about 1.5/1 to about 2.5/1 which is considered to be a relatively narrow range. This is believed to be advantageous because of the selective compatibility with the polymer matrix and because of a contemplated use of the tire in wet and dry conditions over a wide temperature range.

The glass transition temperature Tg of the copolymer resin is considered herein to be in a range of about 20° C. to about 100° C., alternatively about 30° C. to about 80° C., depending somewhat upon the intended use of the prepared tire and the nature of the polymer blend for the tire tread. A suitable measurement of TG for resins is DSC according to ASTM D6604 or equivalent.

The styrene/alphamethylstyrene resin is considered herein to be a relatively short chain copolymer of styrene and alphamethylstyrene with a styrene/alphamethylstyrene molar ratio in a range of about 0.40 to about 1.50. In one aspect, such a resin can be suitably prepared, for example, by cationic copolymerization of styrene and alphamethylstyrene in a hydrocarbon solvent.

Thus, the contemplated styrene/alphamethylstyrene resin can be characterized, for example, by its chemical structure, namely, its styrene and alphamethylstyrene contents and softening point and also, if desired, by its glass transition temperature, molecular weight and molecular weight distribution.

In one embodiment, the styrene/alphamethylstyrene resin is composed of about 40 to about 70 percent units derived from styrene and, correspondingly, about 60 to about 30 percent units derived from alphamethylstyrene. In one embodiment, the styrene/alphamethylstyrene resin has a softening point according to ASTM No. E-28 in a range of about 80° C. to about 145° C.

Suitable styrene/alphamethylstyrene resin is available commercially as Resin 2336 from Eastman or Sylvares SA85 from Arizona Chemical.

The rubber composition may also include from 1 to 3 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

In the rubber composition, the weight ratio of hydrocarbon resin to processing oil is greater than 8.

Also included in the rubber composition is from 60 to 80 phr of pre-hydrophobated precipitated silica. By pre-hydrophobated, it is meant that the silica is pretreated, i.e., the pre-hydrophobated precipitated silica is hydrophobated prior to its addition to the rubber composition by treatment with at least one silane. Suitable silanes include but are not limited to alkylsilanes, alkoxysilanes, organoalkoxysilyl polysulfides and organomercaptoalkoxysilanes.

In an alternative embodiment, the pre-hydrophobated precipitated silica may be pre-treated with a silica coupling agent comprised of, for example, an alkoxyorganomercaptoalkoxysilane or combination of alkoxysilane and organomercaptoalkoxysilane prior to blending the pre-treated silica with the rubber instead of reacting the precipitated silica with the silica coupling agent in situ within the rubber. For example, see U.S. Pat. No. 7,214,731.

The prehydrophobated precipitated silica may optionally be treated with a silica dispersing aid. Such silica dispersing aids may include glycols such as fatty acids, diethylene glycols, polyethylene glycols, fatty acid esters of hydrogenated or non-hydrogenated $C_5$ or $C_6$ sugars, and polyoxyethylene derivatives of fatty acid esters of hydrogenated or non-hydrogenated $C_5$ or $C_6$ sugars.

Exemplary fatty acids include stearic acid, palmitic acid and oleic acid.

Exemplary fatty acid esters of hydrogenated and non-hydrogenated C5 and C6 sugars (e.g., sorbose, mannose, and arabinose) include, but are not limited to, the sorbitan oleates, such as sorbitan monooleate, dioleate, trioleate and sesquioleate, as well as sorbitan esters of laurate, palmitate and stearate fatty acids. Exemplary polyoxyethylene derivatives of fatty acid esters of hydrogenated and non-hydrogenated C5 and C6 sugars include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups.

The optional silica dispersing aids if used are present in an amount ranging from about 0.1% to about 25% by weight based on the weight of the silica, with about 0.5% to about 20% by weight being suitable, and about 1% to about 15% by weight based on the weight of the silica also being suitable.

For various pre-treated precipitated silicas see, for example, U.S. Pat. Nos. 4,704,414, 6,123,762, and 6,573,324.

Suitable pre-hydrophobated silica is available commercially for example from PPG as the Agilon series.

In addition to the pre-hydrophobated silica, the rubber composition may include an untreated, or non-prehydrophated precipitated silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the Journal of the American Chemical Society, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc.; silicas available from Solvay, with, for example, designations of Z1165MP, Z165GR and Zeosil Premium 200MP and silicas available from Degussa AG with, for example, designations VN2 and VN3, etc.

Commonly employed carbon blacks can be used as a conventional filler in an amount ranging from 1 to 10 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm3/100 g.

In one embodiment, the rubber composition may optionally contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

The amount of the optional sulfur containing organo silicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarder, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

In one embodiment, the rubber compositions may include from 1 to 10 phr as a vulcanization modifier an $\alpha$, $\omega$-bis(N, N'-dihydrocarbylthiocarbamamoyldithio)alkane. Suitable $\alpha$, $\omega$-bis(N,N'-dihydrocarbylthiocarbamamoyldithio)alkanes include 1,2-bis(N,N'-dibenzylthiocarbamoyl-dithio)ethane; 1,3-bis(N,N'-dibenzylthiocarbamoyldithio)propane; 1,4-bis(N,N'-dibenzylth-iocarbamoyldithio)butane; 1,5-bis(N,N'-dibenzylthiocarbamoyldithio)pentane; 1,6-bis(N,N'-dibenzylthiocarbamoyldithio)hexane; 1,7-bis(N,N'-dibenzylthiocarbamoyldithio)heptane; 1,8-bis(N,N'-dibenzylthiocarbamoyldithio)octane; 1,9-bis(N,N'-dibenzylthiocarbamoyldithio)nonane; and 1,10-bis(N,N'-dibenzylthiocarbamoyldithio)decane. In one embodiment, the vulcanization modifier is 1,6-bis(N,N'-dibenzylthiocarbamoyldithio)hexane available as Vulcuren from Bayer.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 120° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 80° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Example

In this example, rubber compositions according to the invention are illustrated. Three rubber compounds were prepared following the compositions shown in Table 1, with all amounts given in phr and the compounds further including standard amounts of curatives and additives. The compounds were mixed in a multi-step mix procedure followed by curing and testing as indicated in Table 2.

TABLE 1

|  | Sample | |
|---|---|---|
| Type | 1<br>Control | 2<br>Invention |
| Styrene-Butadiene Rubber [1], Tg = −20° C. | 30 | 30 |
| Polybutadiene [2], Tg = −108° C. | 30 | 30 |
| Natural Rubber, Tg = −64° C. | 40 | 40 |
| Silica[3] | 70 | 0 |
| Prehydrophobated Silica[4] | 0 | 70 |
| Carbon Black | 1 | 1 |
| Oil[5] | 1 | 1 |
| Silane Coupling Agent[6] | 7 | 0 |
| Resin[7] | 16 | 16 |

[1] Styrene-Butadiene rubber solution polymerized, functionalized Tg −20° C.

[2] Polybutadiene, 96 percent cis 1,4; Tg = −108 C., solution polymerized with Nd catalyst, as Budene 1223 from Goodyear.

[3] Precipitated silica, BET 125 m²/g

[4] Prehydrophobated silica as Agilon 400 from PPG

[5] Naphthenic oil

[6] bis-triethoxysilylpropyl disulfide, Evonik

[7] Copolymer of styrene and alpha-methylstyrene, Tg = +39° C., obtained as Sylvatraxx4401 from Arizona Chemicals

TABLE 2

|  | Sample | |
|---|---|---|
| Viscoelastic Properties[1] | 1 | 2 |
| G' (0.83 Hz, 100 C., 15% strain), MPa | 0.205 | 0.231 |
| G' (1 Hz, 100 C., 1% strain), MPa | 1.723 | 1.295 |
| G' (1 Hz, 100 C., 50% strain), MPa | 0.798 | 0.669 |
| Tan delta (1 Hz, 100 C., 10% strain) | 0.100 | 0.098 |
| Cure Properties[2] (60 minutes at 150 C.) | | |
| Delta Torque, dN-m | 16.87 | 11.94 |
| T25, min | 2.3 | 3.39 |
| T90, min | 6.92 | 11.11 |
| Tensile Properties (Cured 10 minutes at 170 C.) | | |
| 300% Modulus, MPa | 10.67 | 7.18 |
| Tensile Strength, MPa | 19.83 | 20.29 |
| Elongation at Break, % | 485 | 610 |
| Tear Strength[3] (Cured 14 minutes at 160 C.) | | |
| Strength, N | 30.76 | 103.72 |
| DIN Abrasion[4] (Cured 14 minutes at 160 C.) | | |
| Relative volume loss | 54 | 80 |

TABLE 2-continued

|  | Sample | |
|---|---|---|
| Viscoelastic Properties[1] | 1 | 2 |
| Zwick Rebound[5] (Cured 14 minutes at 160 C.) | | |
| 0 C. Rebound | 21.5 | 25.76 |
| 23 C. Rebound | 41.39 | 49.19 |
| 60 C. Rebound | 59.52 | 64.26 |
| 100 C. Rebound | 67.31 | 72.6 |

[1] Measured at 2% strain, frequency 0.33/3.33 Hz, 100 C. Data according to Rubber Process Analyzer as RPA 2000 instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, April 26 and May 10, 1993.

[2] Cure properties were determined using a Monsanto oscillating disc rheometer (MDR) which was operated at a temperature of 150.degree. C. and at a frequency of 11 hertz. A description of oscillating disc rheometers can be found in The Vanderbilt Rubber Handbook edited by Robert O. Ohm (Norwalk, Conn., R. T. Vanderbilt Company, Inc., 1990), Pages 554 through 557. The use of this cure meter and standardized values read from the curve are specified in ASTM D-2084. A typical cure curve obtained on an oscillating disc rheometer is shown on Page 555 of the 1990 edition of The Vanderbilt Rubber Handbook.

[3] The tear resistance property (tear strength) determination is conducted for peel adhesion of a sample to another sample of the same material. A description may be found in ASTM D4393 except that a sample width of 2.5 cm is used and a clear Mylar plastic film window of a 5 mm width is inserted between the two test samples. It is an interfacial adhesion measurement (pulling force expressed in N/mm units) between two layers of the same tested compound which have been co-cured together with the Mylar film window there between. The purpose of the Mylar film window is to delimit the width of the pealed area.

[4] Data according to DIN 53516 abrasion resistance test procedure using a Zwick drum abrasion unit, model 6102 with 2.5 Newtons force. DIN standards are German test standards. The DIN abrasion results are reported as relative values to a control rubber composition used by the laboratory.

[5] Rebound is a measure of hysteresis of the compound when subject to loading, as measured by ASTM D1054. Generally, the lower the measured rebound at 100° C., the lower the rolling resistance.

What is claimed is:

1. A pneumatic tire comprising a vulcanizable rubber composition, the vulcanization rubber composition comprising:
   1) 100 parts by weight of elastomer consisting of 25 to 35 phr of a styrene-butadiene rubber, 25 to 35 phr of a polybutadiene, and 35 to 45 phr of a natural rubber or synthetic polyisoprene,
   wherein the styrene-butadiene rubber is a functionalized solution polymerized styrene-butadiene elastomer having a glass transition temperature Tg(A) ranging from −30 to −10° C. and having at least one functional group; the natural rubber or synthetic polyisoprene has a Tg(B) ranging from −60 to −70° C.; and the polybutadiene is a cis 1,4 polybutadiene having a Tg(C) ranging from −110 to −90° C.,
   wherein Tg(A)−Tg(B)≥25° C., and Tg(B)−Tg(C)≥25° C.;
   2) 60 to 80 phr of a prehydrophobated silica;
   3) 1 to 10 phr of carbon black;
   4) 1 to 3 phr of rubber processing oil; and
   5) 5 to 25 phr of at least one hydrocarbon resin having a Tg≥20° C.; wherein the weight ratio of hydrocarbon resin to rubber processing oil is greater than 8.
   6) wherein the rubber composition excludes a free silane coupling agent.

2. The pneumatic tire of claim 1, wherein the functional group comprises at least one of an amino group, a thiol ester group, an alkoxy group, a hydroxyl group, and a silyl group.

3. The pneumatic tire of claim 1, wherein the functional group includes an amino, an alkoxy, and a silyl group.

4. The pneumatic tire of claim 1 wherein the styrene-butadiene rubber comprises functional groups selected from the group consisting of terminal functional groups, in chain functional groups.

5. The pneumatic tire of claim 1, wherein the amount hydrocarbon resin ranges from 10 to 20 phr.

6. The pneumatic tire of claim 1, wherein the amount of carbon black ranges from 1 to 5 phr.

7. The pneumatic tire of claim 1, wherein the hydrocarbon resin comprises a copolymer of styrene and alphamethylstyrene.

8. The pneumatic tire of claim 1, wherein the weight ratio of hydrocarbon resin to oil is greater than 12.

9. The pneumatic tire of claim 1, wherein the prehydrophobated silica comprises an alkoxysilane and an organomercaptoalkoxysilane.

10. A vulcanizable rubber composition comprising:
1) 100 parts by weight of elastomer consisting of 25 to 35 phr of a styrene-butadiene rubber, 25 to 35 phr of a polybutadiene, and 35 to 45 phr of a natural rubber or synthetic polyisoprene,
wherein the styrene-butadiene rubber is a functionalized solution polymerized styrene-butadiene elastomer having a glass transition temperature Tg(A) ranging from −30 to −10° C. and having at least one functional group; the natural rubber or synthetic polyisoprene has a Tg(B) ranging from −60 to −70° C.; and the polybutadiene is a cis 1,4 polybutadiene having a Tg(C) ranging from −110 to −90° C.,
wherein Tg(A)−Tg(B)≥25° C., and Tg(B)−Tg(C)≥25° C.;
2) 60 to 80 phr of a prehydrophobated silica;
3) 1 to 10 phr of carbon black;
4) 1 to 3 phr of rubber processing oil; and
5) 5 to 25 phr of at least one hydrocarbon resin having a Tg≥20° C.; wherein the weight ratio of hydrocarbon resin to rubber processing oil is greater than 8;
wherein the rubber composition excludes a free silane coupling agent.

11. The vulcanizable rubber composition of claim 10, wherein the functional group comprises at least one of an amino group, a thiol ester group, an alkoxy group, a hydroxyl group, and a silyl group.

12. The vulcanizable rubber composition of claim 10, wherein the functional group includes an amino, an alkoxy, and a silyl group.

13. The vulcanizable rubber composition of claim 10 wherein the styrene-butadiene rubber comprises functional groups selected from the group consisting of terminal functional groups, in chain functional groups.

14. The vulcanizable rubber composition of claim 10, wherein the amount hydrocarbon resin ranges from 10 to 20 phr.

15. The vulcanizable rubber composition of claim 10, wherein the amount of carbon black ranges from 1 to 5 phr.

16. The vulcanizable rubber composition of claim 10, wherein the hydrocarbon resin comprises a copolymer of styrene and alphamethylstyrene.

17. The vulcanizable rubber composition of claim 10, wherein the weight ratio of hydrocarbon resin to oil is greater than 12.

18. The vulcanizable rubber composition of claim 10, wherein the prehydrophobated silica comprises an alkoxysilane and an organomercaptoalkoxysilane.

19. The vulcanizable rubber composition of claim 10, in the form of at least one item selected from a tire tread, a shoe, a shoe sole, a vibration isolator, a transmission belt, a hose, a conveyor belt, and a track belt.

* * * * *